No. 644,428. Patented Feb. 27, 1900.
B. HÜBBE.
COMPOUND LIP VALVE.
(Application filed June 1, 1898.)
(No Model.)

Witnesses.
H. L. Reynolds.
Julius Lutz.

Inventor:
B. Hübbe.
By Munn
Attorneys.

UNITED STATES PATENT OFFICE.

BENEDICT HÜBBE, OF HAMBURG, GERMANY.

COMPOUND LIP-VALVE.

SPECIFICATION forming part of Letters Patent No. 644,428, dated February 27, 1900.

Application filed June 1, 1898. Serial No. 682,287. (No model.)

*To all whom it may concern:*

Be it known that I, BENEDICT HÜBBE, a subject of the German Emperor, residing at Hamburg, in the German Empire, have invented certain new and useful Improvements in Compounded Lip-Valves, of which the following is a specification.

My invention relates to valves compounded of several concentric elastic rings bent at the one border upward and fastened to seats arranged in a horizontal face; and my invention consists in arranging the concentric elastic rings one above the other, so that the whole valve is somewhat conical in shape.

The object of my invention is, first, to attain a larger area or sum of openings for the liquid to pass through than is obtainable with the known valves having elastic rings in a horizontal face, and, second, to strengthen the elastic rings in certain cases, so that they will sustain a much larger pressure or head of liquid. The elastic rings may be either in pairs, in which the bent border of the one ring is opposed to the bent border of the other ring, so that they touch each other at the top and open out on the liquid being forced upward, or the elastic rings may be single and so arranged that their bent borders engage the annular walls formed on the seatings when they are closed, but open out inward on the liquid being forced upward. In this case the bent borders of the elastic rings will not only be protected against damages by the said walls, but also strengthened, so that they are enabled to sustain a larger pressure or head of liquid.

The invention is illustrated on the accompanying drawings, wherein—

Figure 1:
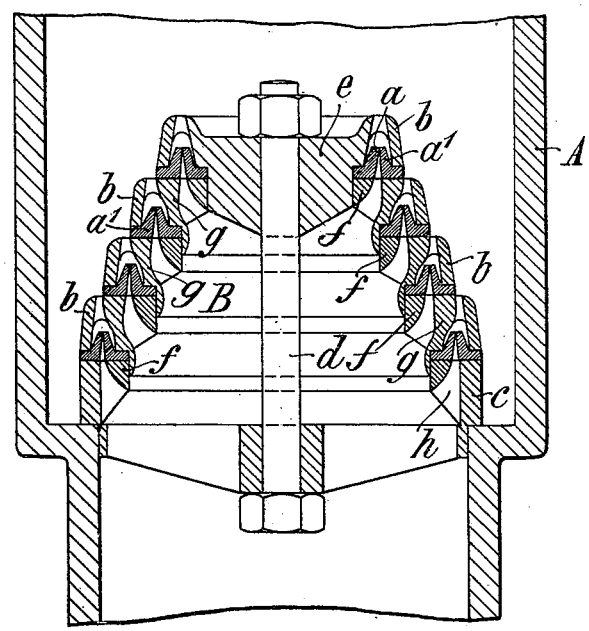
Figure 2:
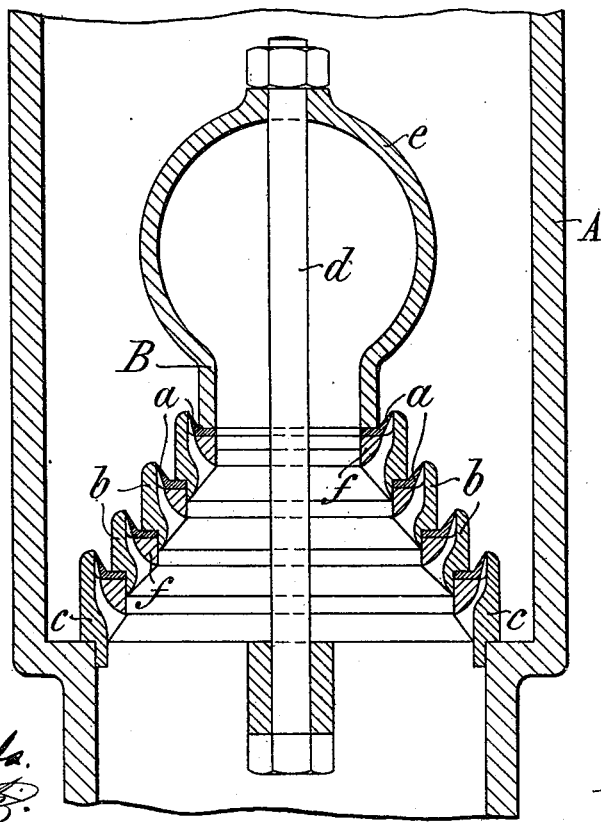

Figure 1 is a cross-section of my valve where the elastic rings are arranged in pairs, and Fig. 2 is a cross-section of the valve with single elastic rings.

The valve B is placed as usual in a chamber A or in a pipe or the like and is there fixed in any convenient manner either by the bolt $d$ or otherwise. According to Fig. 1 the valve consists of several concentric casting pieces placed one above the other and serving as seats for the elastic rings $a\ a'$. The bottom seat has the shape of two annular rings $c$ and $f$, connected with each other by ribs $h$ or similar means. The next following seats have the shape of three annular rings $b$, $g$, and $f$, united by ribs or the like. Each annular ring $b$ serves not only for securing the one elastic ring $a'$ below to its seat, but also for guiding the liquid passing through the openings between the bent borders of the rings $a$ and $a'$. In a like manner the middle annular ring $g$ serves for securing the elastic ring $a$ below to its seat $f$ and for guiding the liquid. Above the top seat is again an annular ring $b$ for securing the one ring $a'$ below and a piece $e$ for securing the other ring $a$ to its seat. The casting piece $e$ may be cast in one piece with the ring $b$ by means of ribs or the like and is arranged for allowing the bolt $d$ to pass through, so as to unite all the seats.

In Fig. 2 the valve B likewise consists in several concentric seats placed one above the other. They are, however, not even as in Fig. 1, but cast in one piece with the rings $b$ by means of ribs or the like, the rings $b$ being so formed as to replace the outer elastic rings $a'$ in each ring pair of Fig. 1. Therefore the seats have all the shape of two annular rings $b$ and $f$, united by ribs or the like. The piece $e$ is here made hollow and somewhat like an air-vessel; but this shape is quite immaterial and may be chosen according to the circumstances.

Having described and shown my invention, I declare that what I claim, and desire to secure by Letters Patent, is—

1. A lip-valve, comprising several pairs of rings arranged or superposed in a conical shape, each pair of rings consisting of a rigid ring and an elastic ring having an upwardly-projecting portion, as set forth.

2. In a compounded lip-valve, the combination with several concentric annular seats arranged one above the other in a conical shape, each seat having at the outer border an annular wall projecting upward, of several elastic rings bent upward at the outer border to form lips with said walls of said seats, substantially as set forth.

3. A valve-seat having circumferentially-disposed ports, a valve-ring of flexible material secured to the upper surface of the seat just within the ports, and having its outer edges turned upwardly, forming a circular flange, and a ring surrounding said valve-ring and against which it seats.

4. A valve consisting of a series of superposed and successively-smaller rings, each having circumferentially-disposed ports opening to their upper surfaces, valve-rings of flexible material secured between successive rings and bordering the ports, the side of said valve-rings next the port extending upwardly to form a flange, and a ring on the opposite side of the ports, forming a valve-seat.

5. A valve, consisting of a series of superposed and successively-smaller rings, each having circumferentially-disposed ports opening to their upper surfaces, valve-rings of flexible material secured between successive rings and bordering the ports, the side of said valve-rings next the port extending upwardly to form a flange, a ring on the opposite side of the ports forming a valve-seat, the top and bottom rings having a central extension, and a bolt passing through the same.

6. A valve composed of a series of superposed and successively-smaller rings, having circumferentially-disposed ports opening to their upper surfaces and having valve-seats bordering the ports and below their upper ends, and flexible valve-rings on said seats, having an upwardly-extending flange next the port, said rings having their horizontal parts secured between the superposed rings.

7. A lip-valve, comprising several pairs of rings superposed one upon the other, each pair of rings, consisting of a rigid and an elastic ring having an upwardly-projecting edge, the rings of each pair being arranged concentrically, as set forth.

8. A valve, comprising a series of seats in the form of rings arranged one upon the other, the rings being of successively-increasing diameter from the top to the bottom and each provided with a port outside of the seat next above, and elastic rings secured between the seats and bent upwardly at one edge to form a lip-valve, substantially as described.

9. A valve, comprising a series of seats in the form of rings arranged one upon the other, the rings being of successive increasing diameter from the top to the bottom, and each provided on its inner face at the base with a flange engaging the inner face of the seat next below, and with ports outside of the seat next above, and elastic rings secured between the seats and bent upwardly at one edge to form a lip-valve, substantially as described.

In witness whereof I have hereunto signed my name, this 18th day of May, 1898, in the presence of two subscribing witnesses.

BENEDICT HÜBBE.

Witnesses:
 C. H. DAY,
 HENRY HASPER.